United States Patent
Chang

(10) Patent No.: US 8,322,305 B2
(45) Date of Patent: *Dec. 4, 2012

(54) **METHOD FOR MAKING FERTILIZER FROM SWINE FECES/URINE BY USING *MUSCA DOMESTICA***

(75) Inventor: Chun-Hsung Chang, Chang-Hua Hsien (TW)

(73) Assignee: New I Ten Rin Enterprise Co., Ltd., Chang-Hua Hsien (TW)

( * ) Notice: Subject to any disclaimer, the term of this patent is extended or adjusted under 35 U.S.C. 154(b) by 190 days.

This patent is subject to a terminal disclaimer.

(21) Appl. No.: 12/956,070

(22) Filed: Nov. 30, 2010

(65) Prior Publication Data

US 2012/0131970 A1     May 31, 2012

(51) Int. Cl.
*A01K 29/00* (2006.01)
(52) U.S. Cl. .......................... 119/6.6; 119/6.5
(58) Field of Classification Search .................. 119/6.5, 119/6.6; 424/76.5, 76.6
See application file for complete search history.

(56) References Cited

U.S. PATENT DOCUMENTS

| | | | | |
|---|---|---|---|---|
| 4,594,964 | A * | 6/1986 | Vargas et al. ................. | 119/6.6 |
| 6,557,487 | B1 * | 5/2003 | Fleischmann ................. | 119/6.5 |
| 6,938,574 | B2 * | 9/2005 | Zhang ........................... | 119/6.6 |
| 2002/0177219 | A1 * | 11/2002 | Olivier ........................... | 435/262 |
| 2003/0143728 | A1 * | 7/2003 | Olivier ........................... | 435/290.1 |
| 2003/0233982 | A1 * | 12/2003 | Zhang ........................... | 119/6.5 |
| 2004/0089241 | A1 * | 5/2004 | Zhang ........................... | 119/6.5 |
| 2011/0296756 | A1 * | 12/2011 | Zhang ........................... | 47/59 R |

OTHER PUBLICATIONS

Larry Newton Using the Black Soldier Fly, *Hermetia illucens*, Value added tool for the Management of swine manure, Nother Carolina State University (USA) Jun. 2006.*

Joseph Diclaro and Phillip Kaufman 'Black soldier fly *Hermetia illucens* Linnaeus (insecta: Diptera: Stratiomyidae)' EENY-461,IFAS Extension Univeristy of Florida (USA) Jun. 2009.*

* cited by examiner

*Primary Examiner* — Isam Alsomiri
*Assistant Examiner* — Justin Benedik
(74) *Attorney, Agent, or Firm* — Alan Kamrath; Kamrath IP Lawfirm, PA

(57) ABSTRACT

A method for making fertilizer from swine feces/urine by using *Musca Domestica* includes breeding and growing imagoes of *Musca Domestica* in an environment having a temperature of 18-35° C. and having a humidity of 50-80%. The imagoes of *Musca Domestica* lay eggs in the environment. The eggs of *Musca Domestic* are transferred into a cultivating material including at least one product of soybean and/or milk. The eggs of *Musca Domestica* are bred at a temperature of 20-35° C. until hatching into larvae. The larvae of *Musca Domestica* are placed on swine feces/urine of a thickness of 4-10 cm at a temperature of 20-35° C. for 2-3 days. The larvae feed on and decompose the swine feces/urine. The swine feces/urine decomposed by the larvae of *Musca Domestica* are collected and used as fertilizer.

13 Claims, 1 Drawing Sheet

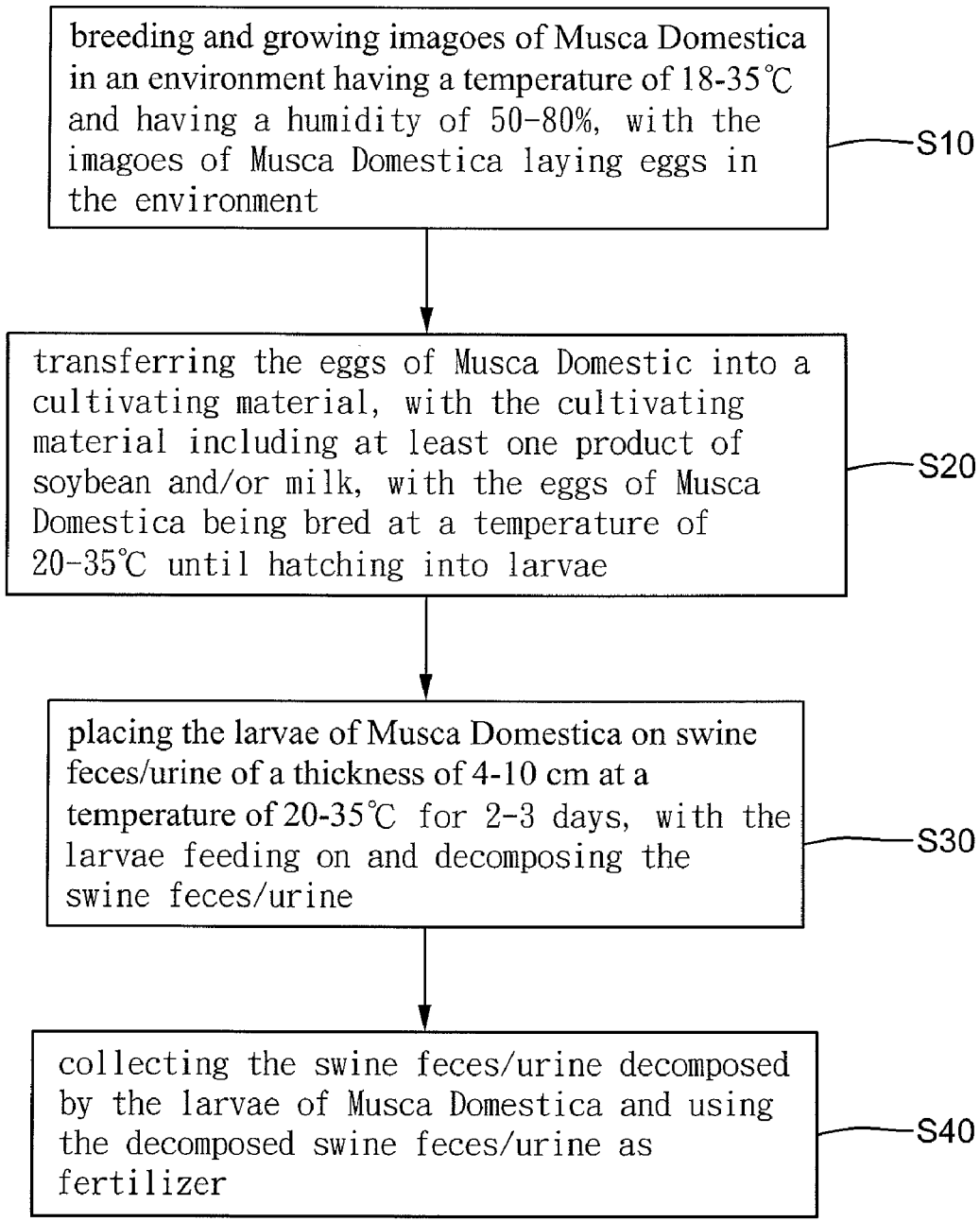

METHOD FOR MAKING FERTILIZER FROM SWINE FECES/URINE BY USING *MUSCA DOMESTICA*

BACKGROUND OF THE INVENTION

The present invention relates to a method for making fertilizer and, more particularly, to a method for making fertilizer from swine feces/urine by using *Musca Domestica*.

The need of plant food is increasing in proportion to the increase in the global population. To increase the growing speed of crops and to avoid infection of phytopathogen, a huge amount of chemical fertilizer and pesticides is used on crops. However, the long-term use of the chemical fertilizer and pesticides has caused harm and pollution to the farm lands and the environment, causing problems such as acidification and solidification of soil, lack of organic substances in soil, imbalance of acid and alkali in soil, soil pollution resulting from chemical fertilizer that can not be absorbed by the plants, and pollution of underground water by dissoluble chemical fertilizer. The organic substances in the soil decreases gradually while the pollution increases gradually. In extreme condition, the effective microorganisms and earthworms in the soil can not survive, causing reduction in the yield and quality of the crops or even incapability of cultivation of the farm lands.

To avoid the disadvantages of chemical fertilizer, use of organic fertilizer receives attention. General sources of organic fertilizer include feces of livestock, food waste, and agricultural waste such as rice stalks, peanut shells, and bagasse. These substances can not be directly absorbed by plants. Namely, a long-term composting procedure is required. However, smell occurs during the composting procedure and may even cause air pollution. In addition to high costs due to long-term composting, the nutritive contents in the organic fertilizer are low, and the releasing speed of the nutrients is slow.

Thus, a need exists for a method for rapidly making highly valuable, harmless, bioorganic fertilizer to assist in cultivation of crops.

BRIEF SUMMARY OF THE INVENTION

To rapidly obtain bioorganic fertilizer, the present invention provides a method for making fertilizer from swine feces/urine by using *Musca Domestica*. The method according to the present invention includes breeding and growing imagoes of *Musca Domestica* in an environment having a temperature of 18-35° C. and having a humidity of 50-80%. The imagoes of *Musca Domestica* lay eggs in the environment. The eggs of *Musca Domestic* are transferred into a cultivating material including at least one product of soybean and/or milk. The eggs of *Musca Domestica* are bred at a temperature of 20-35° C. until hatching into larvae. The larvae of *Musca Domestica* are placed on swine feces/urine of a thickness of 4-10 cm at a temperature of 20-35° C. for 2-3 days. The larvae feed on and decompose the swine feces/urine. The swine feces/urine decomposed by the larvae of *Musca Domestica* are collected and used as fertilizer.

Preferably, the temperature of the environment in which the imagoes of *Musca Domestica* grow and lay eggs is 24-26° C.

Preferably, the humidity of the environment in which the imagoes of *Musca Domestica* grow and lay eggs is 54-56%.

The cultivating material preferably has a water content of 80-95% by weight and more preferably 92% by weight.

Preferably, the cultivating material is received in a Petri dish.

Preferably, the imagoes of *Musca Domestica* lay eggs after the imagoes of *Musca Domestica* have grown 1-3 days.

Preferably, 2-4 grams of the eggs of *Musca Domestica* are transferred per kilogram of the cultivating material.

Preferably, the eggs of *Musca Domestica* hatch into the larvae in 1-2 days.

The swine feces/urine preferably have a water content of 80-95% by weight and more preferably 92% by weight.

Preferably, the swine feces/urine are received in a Petri dish.

Bioorganic fertilizer can be obtained in 5-7 days by the method for making fertilizer from swine feces/urine by using *Musca Domestica* according to the present invention. The fertilizer is full of nutrients for stimulating growth of plants and is antibiotic to repress growth of phytopathogen, reducing the need of chemical fertilizer. Furthermore, by using the method for making fertilizer according to the present invention, the swine cultivators can treat swine feces/urine in an environmentally-friendly way and reuse the swine feces/urine that would have been discarded as waste. Further, the swine cultivators can be benefited by selling the fertilizer.

The present invention will become clearer in light of the following detailed description of illustrative embodiments of this invention described in connection with the drawing.

DESCRIPTION OF THE DRAWING

The drawing shows a block diagram illustrating a method for making fertilizer from swine feces/urine by using *Musca Domestica* according to the present invention.

DETAILED DESCRIPTION OF THE INVENTION

With reference to the drawing, to efficiently treat swine feces/urine and to avoid pollution to air and water, the present invention provides a method for making fertilizer from swine feces/urine by using *Musca Domestica*. The method according to the present invention includes breeding and growing imagoes of *Musca Domestica* (house flies) in an environment having a temperature of 18-35° C. and having a humidity of 50-80%. The imagoes of *Musca Domestica* lay eggs in the environment (S10). The eggs of *Musca Domestic* are transferred into a cultivating material including at least one product of soybean and/or milk. The eggs of *Musca Domestica* are bred at a temperature of 20-35° C. until hatching into larvae (S20). The larvae of *Musca Domestica* are placed on swine feces/urine of a thickness of 4-10 cm at a temperature of 20-35° C. for 2-3 days. The larvae feed on and decompose the swine feces/urine (S30). The swine feces/urine decomposed by the larvae of *Musca Domestica* are collected and used as fertilizer (S40). Examples of the method for making fertilizer from swine feces/urine by using *Musca Domestica* according to the present invention will now be described.

Example 1

Breeding of Imagoes of *Musca Domestica*

An appropriate number of wild *Musca Domestica* were placed in a space and fed with the same food. The wild *Musca Domestica* was tamed after several generations of breeding and propagation, obtaining suitable *Musca Domestica*. The pupae of the tamed *Musca Domestica* before eclosion were placed in an eclosion plate placed in a breeding cage for imagoes. The breeding cage was a sealed net cage having a size of 100-120 cm×60-80 cm×100-200 cm. The imagoes could not fly out of the breeding cage. Furthermore, the breeding cage was placed in a breeding room. The temperature of the breeding room was preferably of 18-35° C., most preferably 24-26° C. The humidity of the breeding room was preferably 50-80%, more preferably 54-56%. Further, the number of imagoes of *Musca Domestica* in the breeding cage was preferably 40,000-120,000. The breeding cage was under the light for 8-16 hours. Since the imagoes do not lay eggs in a dark environment, the breeder can adjust the period of time of the light and the dark according to the time the eggs are to be fetched. Furthermore, a tag can be affixed to the breeding cage to indicate the date on which the imagoes laid eggs and the number of eggs for control purposes.

The pupae of *Musca Domestica* turned into imagoes in 3 or 4 days. After eclosion, a food plate and a water plate were placed into the breeding cage for the imagoes. The foodstuff in the food plate included dairy products (such as milk powders) and sugar that imagoes are fond of. The imagoes began to lay eggs in 1-3 days after eclosion. A laying pan was placed into the breeding cage at that time. A laying pad was received in the laying pan. Substances such as fermented food (fermented milk or the like) capable of attracting the imagoes of *Musca Domestica* were adhered to the laying pad to attract the imagoes to lay eggs on the laying pad. The eggs were gathered periodically, and the laying pad was replaced.

Example 2

Breeding of Larvae of *Musca Domestica*

1. First-Stage Breeding

An appropriate number of eggs of *Musca Domestica* were transferred into a plurality of first Petri dishes. 70-80% of the volume of each first Petri dish was filled with a cultivating material (about 6-8 cm in thickness). The cultivating material included at least one product of soybean and/or milk. A water content of the cultivating material was 80-95% by weight and more preferably 92% by weight. Namely, the solid content of the product of soybean and/or milk of the cultivating material was 5-20% by weight and more preferably 8% by weight. The eggs of *Musca Domestica* were bred at a temperature of 20-35° C. for several days until hatching into larvae (i.e., maggots). The water containing cultivating material provided a moist, nutritive environment for the larvae after hatching. This was the first-stage breeding.

The number of eggs was decided according to the amount of cultivating material received in each first Petri dish. Namely, it was estimated how many larvae could feed on the amount of cultivating material to estimate the number of eggs to be transferred into each first Petri dish. In an example, 2-4 grams of eggs of *Musca Domestica* were transferred per kilogram of cultivating material. The breeding underwent 1-2 days. Each first Petri dish was, but not limited to, a small container having a diameter of 10-12 cm and a height of 8-10 cm.

2. Second-Stage Breeding

Swine feces/urine were placed into a plurality of second Petri dishes to a thickness of 4-10 cm. The swine feces/urine had a water content of 80-95% by weight and more preferably 92% by weight. An appropriate number of larvae obtained in the first-stage breeding was placed on the swine feces/urine and bred at a temperature of 20-35° C. for 2-3 days. The swine feces/urine were decomposed by the larvae in 2-3 days. During the breeding period, the larvae fed on the swine feces that provided a moist, nutritive environment for the larvae. This was the second-stage breeding.

The number of larvae was decided according to the amount of pig feces in each second Petri dish. Namely, it was estimated how many larvae could feed on the amount of pig feces to estimate the number of larvae to be transferred into each second Petri dish. Generally, the larvae bred in a first Petri dish were placed into a second Petri dish. Each second Petri dish was, but not limited to, a large container having a length of 60-80 cm, a width of 30-50 cm, and a height of 8-14 cm.

Furthermore, since two-stage breeding is used from hatching of the eggs through growing of the larvae, the growing speed of the larvae can be increased. Further, the volume of cultivating material received in each first Petri dish (small container) is less than the pig feces received in each second Petri dish (large container), allowing observation of hatching of the eggs and growth of the larvae while assisting in adjustment and control of the first-stage breeding. The hatching rate and growth of the larvae are increased. The problems of low hatching rate and slow growth or even death of larvae resulting from difficulties in control of using large breeding containers are, thus, avoided. The costs of workers and other expenditures for fixing the problems are cut.

In the method according to the present invention, suitable breeding conditions are given in the breeding procedures from imagoes to larvae of *Musca Domestica*. Thus, the imagoes and larvae of *Musca Domestica* can grow in suitable environments. Furthermore, the two-stage breeding increases the growing speed of the larvae, shortens the breeding time, increases the yield, and improves the quality of the larvae.

Example 3

Making Fertilizer

During the second-stage breeding, the larvae of *Musca Domestica* moved into the swine feces/urine and grew by absorbing the nutritive ingredients in the swine feces/urine. The swine feces/urine eaten by the larvae were decomposed by the special enzymes in the larvae and then excreted out of the larvae. The excretion of the larvae can be used as excellent organic fertilizer. Furthermore, the antibiotics contained in the saliva and bodies of the larvae inhibited growth of harmful bacteria while decomposing the swine feces/urine. Furthermore, the secretion of the larvae adhered to the decomposed swine feces/urine after decomposition. The secretion of the larvae contained antibiotics that imparted antibiotic properties to the decomposed swine feces/urine (fertilizer).

The decomposed swine feces/urine alone can be used as fertilizer. Furthermore, the decomposed swine feces/urine can be used with other fertilizers that are advantageous to growth, flowering, or fruiting of plants, reducing the amount of expensive fertilizers and cutting the fertilizer costs.

According to the foregoing, bioorganic fertilizer can be obtained in 5-7 days by the method for making fertilizer from swine feces/urine by *Musca Domestica* according to the present invention while turning swine feces/urine into reusable substances. Furthermore, since undigested nutritive ingredients in the foodstuff remains in the swine feces/urine and since the swine feces/urine decomposed by the larvae of *Musca Domestica* are antibiotic, the fertilizer containing the decomposed swine feces/urine can provide nutritive ingredients required by growing plants. Thus, the growth of plants is increased while inhibiting growth of phytopathogen that causes diseases of plants. Further, the fertilizer formed by the swine feces/urine is natural and, thus, will not cause adverse effect to the environment.

On the other hand, the method according to the present invention rapidly treats swine feces/urine in an environmentally-friendly way by using larvae of *Musca Domestica* such that discharge of the swine feces/urine into water sources, such as rivers, and subsequent pollution are avoided. Furthermore, the tools and equipment used in the method for making fertilizer from swine feces/urine are simple and inexpensive. Thus, the swine feces/urine can be treated at low costs. Furthermore, the tools and equipment occupy a small area and can be easily operated by the swine cultivators, allowing mass-scale production of bioorganic fertilizer.

Although specific embodiments have been illustrated and described, numerous modifications and variations are still possible without departing from the essence of the invention. The scope of the invention is limited by the accompanying claims.

The invention claimed is:

1. A method for making fertilizer from swine feces/urine by using *Musca Domestica* comprising:
   breeding and growing imagoes of *Musca Domestica* in an environment having a temperature of 18-35° C. and having a humidity of 50-80%, with the imagoes of *Musca Domestica* laying eggs in the environment;
   transferring the eggs of *Musca Domestic* into a cultivating material, with the cultivating material including at least one product of soybean or milk, with the eggs of *Musca Domestica* being bred at a temperature of 20-35° C. until hatching into larvae;
   placing the larvae of *Musca Domestica* on swine feces/urine of a thickness of 4-10 cm at a temperature of 20-35° C. for 2-3 days, with the larvae feeding on and decomposing the swine feces/urine; and
   collecting the swine feces/urine decomposed by the larvae of *Musca Domestica* and using the decomposed swine feces/urine as fertilizer.

2. The method as claimed in claim 1, with placing the larvae of *Musca Domestica* on the swine feces/urine including placing the larvae of *Musca Domestica* on the swine feces/urine having a water content of 80-95% by weight.

3. The method as claimed in claim 1, with placing the larvae of *Musca Domestica* on the swine feces/urine including placing the larvae of *Musca Domestica* on the swine feces/urine having a water content of 92% by weight.

4. The method as claimed in claim 1, with breeding and growing the imagoes of *Musca Domestica* including growing the imagoes of *Musca Domestica* having a temperature of 24-26° C., with the imagoes of *Musca Domestica* laying eggs in the environment.

5. The method as claimed in claim 1, with breeding and growing the imagoes of *Musca Domestica* including growing the imagoes of *Musca Domestica* in the environment having a humidity of 54-56%, with the imagoes of *Musca Domestica* laying eggs in the environment.

6. The method as claimed in claim 1, with the imagoes of *Musca Domestica* laying eggs after the imagoes of *Musca Domestica* has grown 1-3 days.

7. The method as claimed in claim 1, with the eggs of *Musca Domestica* hatching into the larvae in 1-2 days.

8. The method as claimed in claim 1, with transferring the eggs of *Musca Domestica* including transferring 2-4 grams of the eggs of *Musca Domestica* per kilogram of the cultivating material.

9. The method as claimed in claim 1, with transferring the eggs of *Musca Domestica* including transferring the eggs of *Musca Domestica* into the cultivating material in a Petri dish.

10. The method as claimed in claim 1, with transferring the eggs of *Musca Domestica* including transferring the eggs of *Musca Domestica* into the cultivating material having a water content of 80-95% by weight.

11. The method as claimed in claim 1, with transferring the eggs of *Musca Domestica* including transferring the eggs of *Musca Domestica* into the cultivating material having a water content of 92% by weight.

12. The method as claimed in claim 1, with transferring the eggs of *Musca Domestica* including transferring the eggs of *Musca Domestica* into the cultivating material including milk powders.

13. The method as claimed in claim 1, with placing the larvae of *Musca Domestica* on the swine feces/urine including placing the larvae of *Musca Domestica* on the swine feces/urine received in a Petri dish.

* * * * *